Oct. 20, 1970 — J. L. TOMLINSON — 3,534,637

NEUTRAL CONTROL STARTING MECHANISM

Filed May 29, 1969 — 2 Sheets-Sheet 1

INVENTOR
John L. Tomlinson
BY Dressler, Goldsmith, Clement & Gordon
ATTORNEYS

Oct. 20, 1970  J. L. TOMLINSON  3,534,637
NEUTRAL CONTROL STARTING MECHANISM
Filed May 29, 1969  2 Sheets-Sheet 2
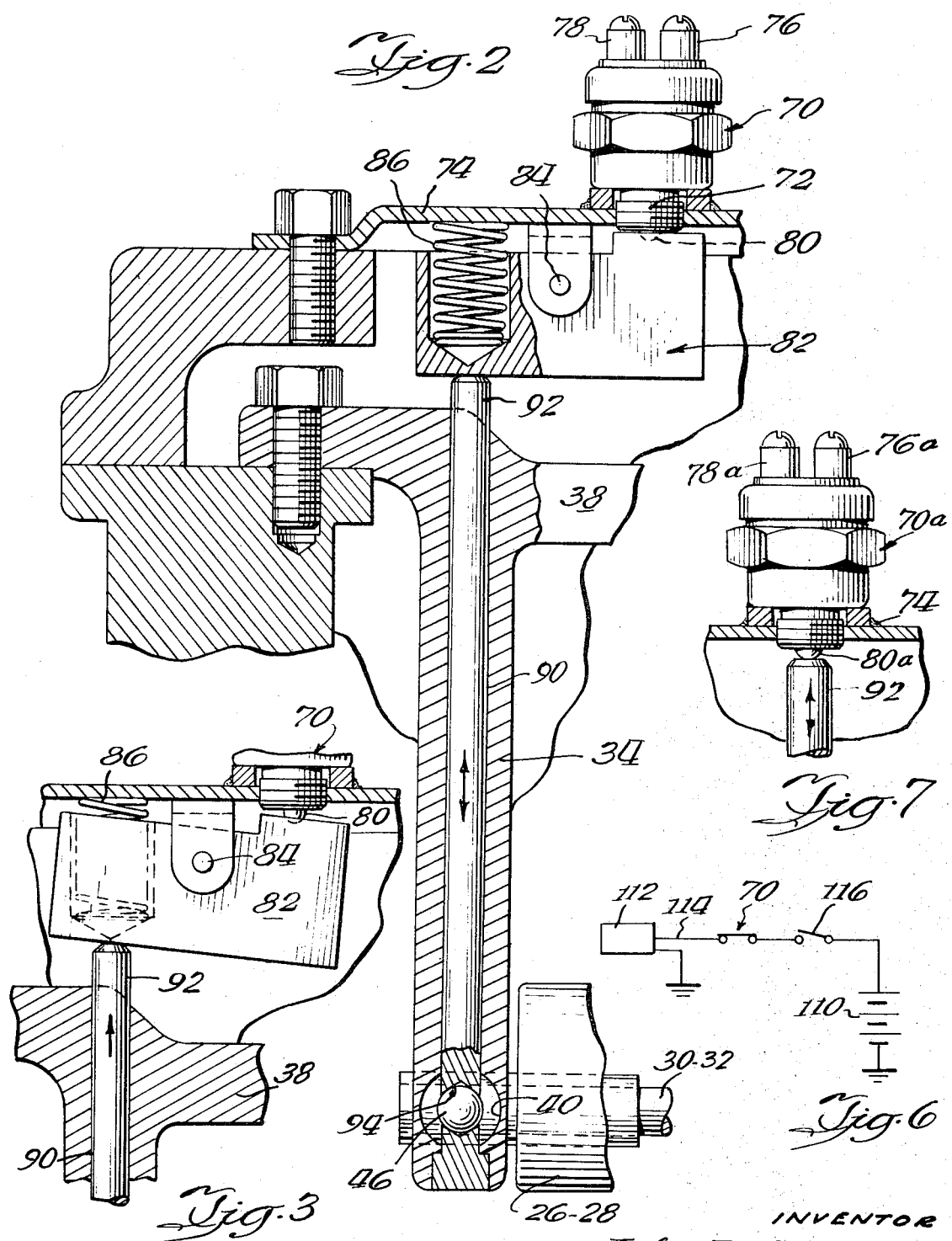
INVENTOR
John L. Tomlinson
BY Dressler, Goldsmith, Clement & Gordon
ATTORNEYS

United States Patent Office 3,534,637
Patented Oct. 20, 1970

3,534,637
NEUTRAL CONTROL STARTING MECHANISM
John L. Tomlinson, Oak Creek, Wis., assignor to J. I. Case Company, a corporation of Wisconsin
Filed May 29, 1969, Ser. No. 828,839
Int. Cl. B60k 23/02; F16h 5/30; G05g 5/10
U.S. Cl. 74—850                                   12 Claims

ABSTRACT OF THE DISCLOSURE

Mechanism for rendering the starting circuit of a vehicle inoperative whenever the vehicle transmission is in an engaged position. The mechanism includes a switch incorporated in the starting circuit which is opened in response to movement of the shifting device for the transmission from a neutral to an engaged position. The mechanism further includes an axially shiftable rod having a free end cooperating with the switch and having an opposite end engageable with a transversely movable member. Cooperating surfaces are defined between the transversely movable member and the opposite end of the rod to shift the rod in response to transverse movement of the member. The transverse member is moved in response to shifting of the shifting device to an engaged position and also defines the interlock means between two shifting devices so as to lock one shifting device in the neutral position when the other shifting device is in the engaged position.

BACKGROUND OF THE INVENTION

The present invention relates generally to vehicle safety devices and more particularly to mechanisms which will insure that the vehicle transmission is in neutral condition when the vehicle is started.

In most vehicles, particularly agricultural vehicles, it is highly desirable to incorporate mechanism which will insure that the transmission for the vehicle is in a neutral condition whenever the engine is started. While many such mechanisms have been proposed, the prior art mechanisms have in many instances been expensive to construct and install and/or are capable of being rendered inoperative by the operator at his discretion. Also, if the safety devices require any special attention from the operator, many operators will disregard such devices and will take their chances on the possibility of a serious accident.

Thus, there is still a need for a simple and effective device which renders the starting circuit inoperative whenever the vehicle transmission is in an engaged position and which is incorporated into the vehicle in such a manner so as to be difficult to exclude the device from the vehicle starting circuit and which does not require any attention from the operator.

SUMMARY OF THE INVENTION

The present invention provides a simple and effective mechanism for rendering the starting circuit inoperative whenever the vehicle transmission is in the engaged position. Furthermore, according to one aspect of the invention, the mechanism cooperates with interlocking mechanism for the transmission shifting devices so that a small number of parts are required for incorporating the present mechanism into a commercially available vehicle. Also, the parts of the present mechanism are simple and inexpensive to construct as well as maintain.

The neutralizing mechanism for the vehicle starting circuit includes a normally closed switch incorporated in the starting circuit which is opened in response to movement of the vehicle transmission shifting mechanism from the neutral position. The means for opening the switch cooperates with one form of interlock mechanism which is found in many types of present-day commercial vehicle transmissions, particularly transmissions for agricultural vehicles.

The particular interlock mechanism just referred to includes a ball slidably disposed in a transversely extending bore disposed between two axially extending shifting rails. The ball is moved into a recess on one of the shifting rails when the other shifting rail is in the engaged position.

According to one aspect of the present invention, the neutralizing mechanism of the present invention incorporates a rod having a cooperating surface on one end thereof which engages the peripheral surface of the ball to cause axial shifting of the rod when the ball is shifted transversely in response to actuation of either of the shifting mechanisms. The opposite end of the rod directly engages the switch or alternatively cooperates with a pivoted member that is normally biased to a first position and has a portion thereof in engagement with the switch incorporated in the starting circuit. Thus, whenever either of the transmission shifting devices are moved to an engaged position, the switch will be opened to render the starting circuit inoperative.

BRIEF DESCRIPTION OF DRAWING

FIG. 2 is an enlarged vertical sectional view of the present invention;

FIG. 3 is a fragmentary view similar to FIG. 2 showing the mechanism in its operative position which renders the starting circuit inoperative;

FIG. 6 is a schematic showing of an illustrative starting circuit which may have the present invention incorporated therein; and FIG. 7 is a fragmentary view of a slightly modified form of the invention.

DETAILED DESCRIPTION

Figure 1:
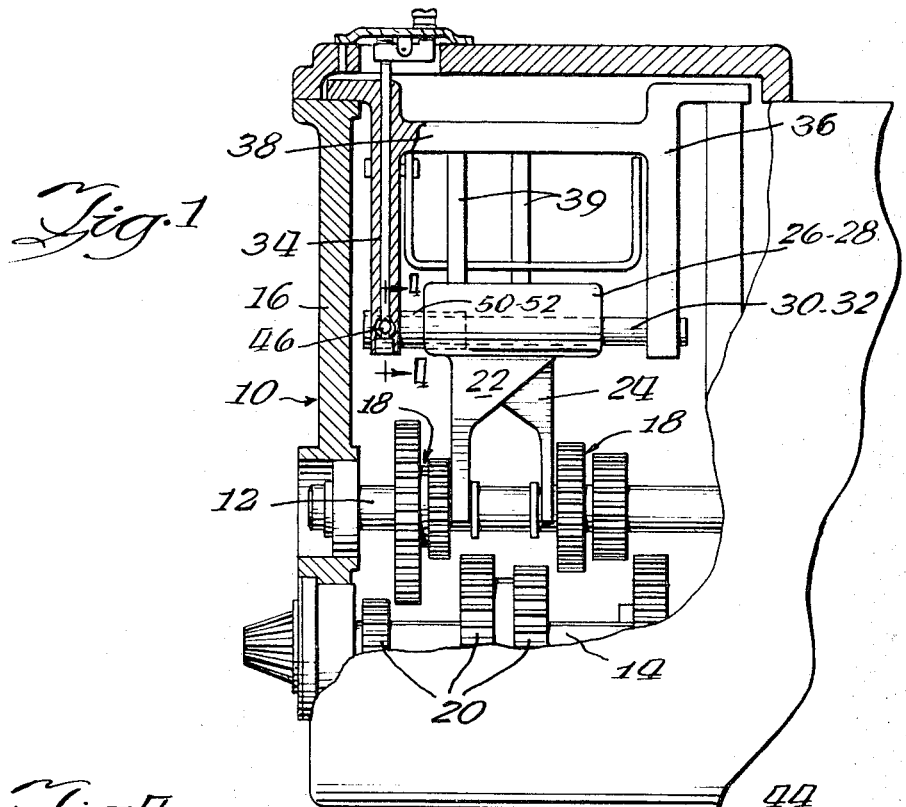
FIG. 1 is a fragmentary side elevational view of a transmission, partly in section, having the present invention incorporated therein.

FIG. 1 of the drawings discloses a transmission 10 for an agricultural vehicle (not shown) having the present invention incorporated therein. The transmission includes a pair of shafts 12 and 14 suitably supported in a housing 16 with the shaft 12 having a plurality of gear clusters 18 rotatable therewith and axially shiftable thereon to place selected gears of the respective clusters 18 in mesh with a plurality of gears 20 fixed to the shaft 14.

The respective gears 18 are adapted to be placed in selective engagement or mesh with the gears 20 by a pair of shifter forks 22 and 24 respectively having hubs 26 and 28 slidably supported on shafts or shifter rails 30 and 32. The respective rails 30 and 32 are supported in openings on depending legs 34 and 36 of a bracket 38 forming part of the support 16. The respective shifter forks 22 and 24 are moved along the shafts or rails 30 and 32 by suitable levers or other actuating mechanisms (not shown) connected to actuating members 39. Since the actuating mechanism does not form a part of the present invention, no detailed description thereof appears to be necessary.

As can be appreciated, in order to have the transmission output shaft 14 connected to shaft 12, one of the shifter forks must be moved from the neutral position shown in FIG. 1 in order to provide engagement of one of the gears 18 with one of the gears 20. Furthermore, it is desirable to provide interlocking mechanism which will insure that one of the shifting mechanisms or devices comprising shifting fork 22 and 24 remains in the neutral condition when the other of the shifting mechanisms 22 or 24 is in the engaged position. This is necessary to prevent simultaneous shifting of two gears 18 in mesh with two gears 20 which would destroy the transmission.

One type of interlock mechanism which has previously been proposed and which is being commercially utilized is a transversely shiftable ball or member disposed in a bore or opening located between the two shafts or rails 22 and 24 which are provided with recesses so that the ball is forced into one of the recesses when the other of the mechanisms is moved to the engaged position. Such an interlock mechanism is disclosed in Hinke Pat. No. 3,347,108.

According to one aspect of the present invention, the neutral start mechanism is incorporated into a shifting mechanism interlock of the type disclosed in the above mentioned Hinke patent. For this purpose, the depending leg or support 34 has a transversely extending bore or opening 40 the opposite ends of which are in communication with axially extending openings 42 and 44 in support 34 and respectively receive one end of each of the shafts 30 and 32. A transversely shiftable member or ball 46 is located in the opening or bore 40 and is adapted to be moved axially of the bore in response to longitudinal movement of either of the shifter forks 22 and 24 along the shafts 30 and 32.

The means for moving the ball or member 46 includes sleeves 50 and 52, respectively, connected to one end of respective ones of the shifter forks or hubs 26 and 28. The respective sleeves 50 and 52 are slidably supported on the shafts or rails 30 and 32 and each have transversely extending openings or rcesses 54 and 56 for receiving the ball or member 46 in a manner which will become apparent hereinafter.

The recesses or openings 54 and 56 are axially positioned on the respective sleeves 50 and 52 in a manner that they will be in alignment with the transversely extending bore or opening 40 when both of the shifter forks are in the neutral position. In such neutral position of both shifter forks, the ball 46 will be partially disposed in each of the openings in a manner more clearly shown in FIG. 4. However, should one of the shifter forks be moved axially with respect to the associated rail, as for example shifter fork 24, the ball or member 46 will be forced out of the opening or recess 56 and assume the position shown in FIG. 5. In the position shown in FIG. 5, the ball or transversely shiftable member 46 is in surface contact with the peripheral surface of the sleeve or tube 52 and a portion of the ball extends into the opening or recess 54. Thus, the interlocking member or ball 46 will lock the shifter fork 24 in the neutral position and prevent simultaneous shifting of both shifter forks or mechanisms into the engaged position.

Figure 4:
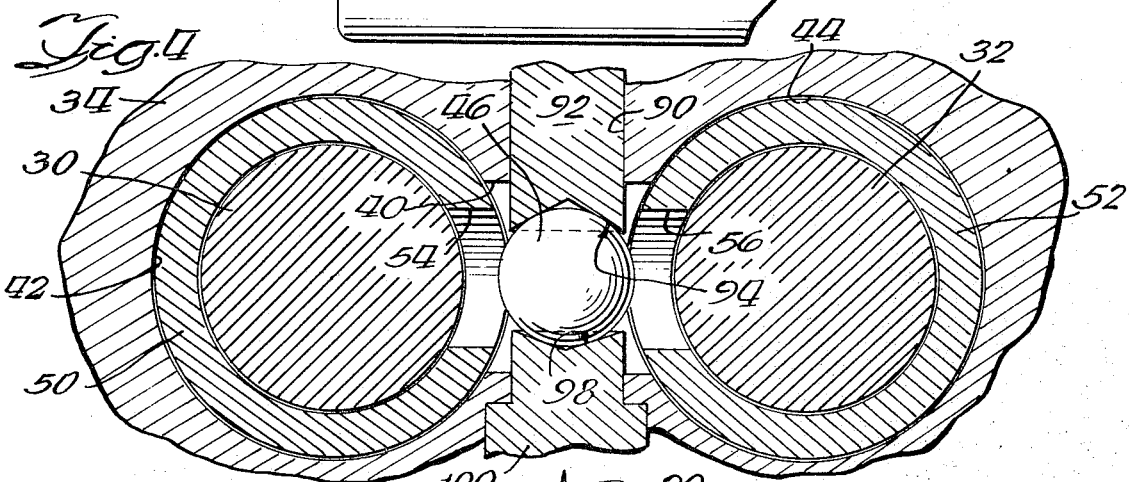
FIG. 4 is an enlarged sectional view of the various parts when the transmission is in the neutral position.

As was indicated above, the neutral starting control mechanism of the present invention cooperates with shifting of either of the shifting members or mechanisms from the neutral position to render the starting circuit inoperative and, more particularly, cooperates with the interlock mechanism to render the starting circuit inoperative whenever the interlock mechanism or ball 46 is moved from the neutral position shown in FIG. 4.

Thus, the neutral starting control mechanism includes a switch 70 having a threaded portion 72 received in an opening in a plate 74 forming part of the transmission housing or support 16. The switch 70 includes two terminals 76 and 78 for incorporation into the starting circuit, in a manner which will be described hereinafter.

The switch 70 has a switch button 80 extending from the lower end thereof and disposed in the path of a member 82 pivoted at 84 intermediate its ends on the support plate 74. The pivoted member 82 is biased to a first position by a spring 86 engaging the plate 84 and received in a counterbore 88 so as to maintain the normally open switch button 80 in the depressed position shown in FIG. 2 in which the switch 70 is in the closed condition.

Figure 5:
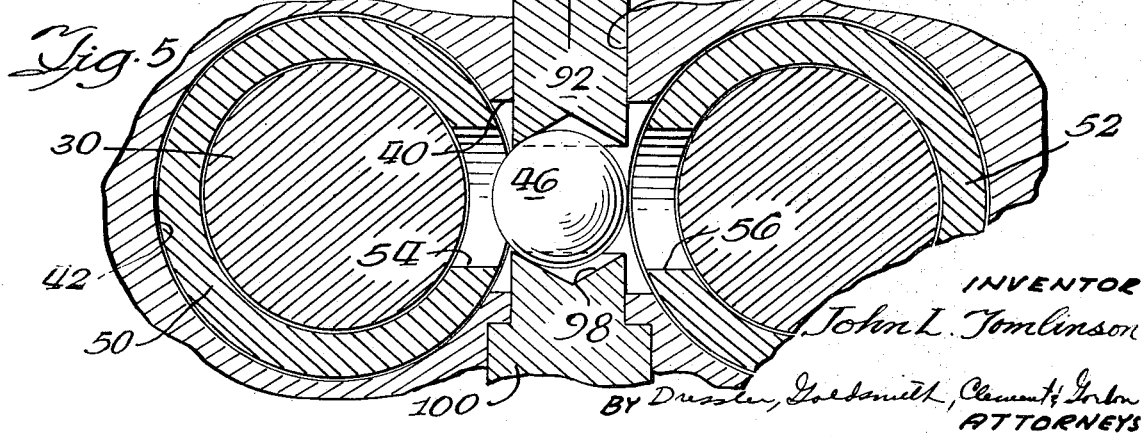
FIG. 5 is a view similar to FIG. 4 showing the various parts when the transmission is in the engaged position.

The axis of the counterbore 88 in member 82 is in substantial alignment with the axis of a further opening or bore 90 extending through the depending leg 34 of bracket 38 with the opposite end of the opening communicating with the transversely extending bore or opening 40 as is more clearly shown in FIGS. 4 and 5. An axially shiftable member or means 92 is slidably disposed in the opening 90 and has one end in engagement with the member 82 while the opposite end thereof has an inclined camming surface 94 defined thereon and engaging the peripheral surface of the ball 46. The cooperating surfaces defined by inclined surface 94 and the spherical surface of ball 46 coact to axially shift the rod 92 upwardly when the ball is moved from the neutral position shown in FIG. 4.

In order to provide axial shifting of the rod 92 when the ball is moved in either direction from the neutral position shown in FIG. 4, the inclined camming surface 94 is in the form of a cone shaped counterbore defining a conical recess which has circumferential contact with the surface of the ball when the ball is in the neutral position. However, if the ball is moved to the position shown in FIG. 5, the peripheral cooperating surfaces and more particularly the point of contact will be shifted transversely to the axis of the shaft or rod 92 to thereby produce the upward movement mentioned hereinabove.

In order to insure a sufficient amount of vertical movement of the shaft without having a relatively sharp inclination of the camming surface, 94, another aspect of the present invention contemplates increasing the amount of movement of the rod 92 in response to transverse shifting of the member 46.

This is accomplished by a second cooperating inclined camming surface 98, again in the form of a conical recess defining the surface, and defined on a plug 100 extending into the transversely extending opening 40 and engaging the peripheral surface of ball 46. The axis of the conical surface is in alignment with the axis of the rod 92 therefore providing additional movement of the rod in response to transverse shifting of the ball with respect to the rod.

An illustrative starting circuit is disclosed in FIG. 6 and incorporates the neutral starting control switch 70 forming part of the present invention. The starting circuit includes a power source or battery 110 included as part of the vehicle (not shown) and connected to a starter motor 112 through suitable wiring 114 having a starting switch 116, the switch 70 incorporated therein.

The operation of the device is believed to be apparent from the above description. However, for purposes of completeness, applicant will briefly outline the sequence of events embodied in the present invention.

Assuming that the transmission is in the neutral condition shown in FIG. 1, it will be seen from an inspection of FIG. 4, that the openings or recesses 54 and 56 are aligned with the axis of the bore or opening 40 thereby allowing the ball to assume the position wherein a portion of the ball is disposed in each of the recesses. In this condition, the spring 86 pivots the member 82 to the position shown in FIG. 2 thereby depressing switch button 80 to close the normally open switch 70. It will be appreciated that the spring 86 also assists in assuring that the ball 46 assumes the position shown in FIG. 4 due to the cooperating surfaces on rod 92 and the ball 46.

If either of the shifting devices 22 or 24 is moved from the neutral position, the ball or member 46 will be shifted transverse to the axis of the rod 92 thereby causing an axial shifting of the rod 92 as a result of the cooperating surfaces 94 and 98 and the peripheral surface of the ball 46. This will move the member 82 from the position shown in FIG. 2 to that shown in FIG. 3 thereby allowing the biasing mechanism incorporated within switch 70 to move the switch button 80 to the open condition. In the open condition, the circuit between the power source 110 and the starting motor 112 will be interrupted to prevent a starting of the engine for the vehicle when either of the shifting mechanisms are in the engaged position.

The slightly modified embodiment of the present invention is shown in FIG. 7 which incorporates a switch 70a substantially identical to switch 70 with the exception that the latter switch is biased to a normally closed condition and in which upward movement of the pin or button 80a will cause an opening of the switch. In the modified embodiment, the pivoted member 82 may be completely eliminated and the upper free end of the rod 92 placed in direct engagement with the switch button 80a.

Thus, upward movement of the rod 92 will open the switch 70a to interrupt the circuit in a manner identical to that described hereinabove. Again, the biasing mechanism or spring incorporated within the switch 70a will assist in forcing the rod 92 axially downwardly and also assist in positioning the transversely shiftable member 46 to the neutral position shown in FIG. 4 whenever both of the shifting mechanisms or forks are in the neutral condition.

While the above invention has been described and disclosed in connection with a shifting mechanism which incorporates shifting forks 22 and 24 slidable on rods or rails 30 and 32, it is readily apparent that the device of the present invention could also be incorporated into a mechanism wherein the shifting fork is fixedly secured to the rail and the rail is axially slidable within the openings 42, 44 defined in the support members or legs 36 and 38. For example, the neutral starting control mechanism is equally applicable to a shifting mechanism of the type disclosed in the above mentioned Hinke patent and the circumferential grooves or recesses defined on the respective rails disclosed in the above mentioned patent will perform the interlocking between the support and one rail in a manner identical to that described hereinabove in connection with the recesses 54 and 56 defined on the respective sleeves or tubes 50 and 52.

Also, while the interlock mechanism or transversely shiftable member has been disclosed as a ball, it is readily apparent that the ball could be replaced by a wedge type member and the camming surfaces 94 and/or 98 would then be defined by a V-shaped groove and would perform the same function in the same manner as that of the spherical member. Furthermore, with a wedge shaped type member, the inclination of the cooperating surfaces between rod 92 and member 46 could be sufficiently inclined so as to eliminate the lower camming surfaces 98.

Thus, it can be appreciated that the present invention provides a simple and effective manner of incorporating a fool proof neutral starting control mechanism into most production type transmissions. The mechanism includes a small number of parts which are easily manufactured and which are relatively inexpensive. Also, the mechanism is incorporated into the circuit in a rather inaccessible position so that it is highly improbable that an operator will disconnect the neutral starting control mechanism thereby insuring that the mechanism will at all times be incorporated into the starting circuit.

Furthermore, the invention could be further modified by incorporating a sealed type switch which could be located directly within the transmission housing and could include an extended surface defined on the button 80 or 80a so that the rod 92 as well as the member 82 could be eliminated and the switch could be actuated directly by, for example, having a V-shaped surface defined on block 100 and a transversely shiftable member which includes cooperating V-shaped surfaces on one side thereof which would shift the wedge member transversely of the axis of the bore or opening 40. With this type of structure, the opposite side of the wedge shaped member could be a flat surface which engages the button 80 or 80a and which would open and close the switch in response to transverse movement of the member 46.

What is claimed is:

1. In combination with a support, first and second shifting mechanisms transversely spaced and axially shiftable on said support, and interlock means between said shifting mechanism including a shiftable first member slidable in a bore in said support and communicating at opposite ends with said shifting mechanisms and a recess in each of said shifting mechanisms for receiving said member whereby shifting of one of said shifting mechanisms will move said member out of one of said recesses and into another of said recesses; a starting circuit for an engine and having a switch incorporated therein, said switch being normally closed, and means interposed between said switch and said member for moving said switch to an open condition when said member is moved out of either of said recesses to render said starting circuit inoperative.

2. The combination as defined in claim 1, including the further improvement of said last means comprising mechanism defining a camming surface in said bore and engaging said member for shifting said member transversely of said bore in response to shifting of either of said shifting mechanisms.

3. The combination as defined in claim 1, including the further improvement of said last means comprising an axially shiftable second member having one end cooperating with said switch and an opposite end cooperating with said first member, and cooperating means defined on said members for axially shifting said second member in response to movement of said first member.

4. The combination as defined in claim 3, in which said cooperating means comprises a first camming surface defined on said first member, and a second camming surface defined on the opposite end of said second member and engaging said first camming surface.

5. The combination as defined in claim 1, and wherein said member comprises a spherical member axially shiftable in said bore in response to movement of either of said shifting mechanisms, said means comprising a rod slidably disposed in an opening in said support and communcating with said bore, said rod having opposite ends respectively in engagement with said switch and said ball, and means for axially shifting said rod in said opening in response to axial movement of said ball in said bore.

6. The combination as defined in claim 5, including the further improvement of said last means defining camming surfaces on said rod and in said bore and engaging said ball at diametrically opposed points.

7. In a vehicle having an engine, a transmission powered by said engine, shifting mechanism movable between neutral and engaged positions for conditioning said transmission from a neutral condition to an engaged condition, and starting means for said engine, the improvement of means rendering said starting means inoperative when said transmission is in engaged condition and comprising normally closed switch means in said starting means, an axially shiftable member having an inclined surface on one end and an opposite end cooperating with said switch means, a transversely shiftable member having a cooperating surface engaging said inclined surface, and means for moving said transversely shiftable member in response to movement of said shifting mechanism from said neutral position whereby said cooperating surfaces move said axially shiftable member and move said switch to said open position upon movement of said shifting mechanism from a neutral position.

8. The combination as defined in claim 7, including the further improvement of said switch means comprising a normally open switch having an actuating button extending therefrom, a member supported on a pivot axis intermediate its ends and engaging said button on one side of the pivot axis with said axially shiftable member engaging said pivoted member on an opposite side of the pivot axis.

9. The combination as defined in claim 7, including the further improvement of said switch means comprising a normally closed switch having an actuating button extending therefrom with said opposite end of said axially shiftable member engaging said button.

10. The combination as defined in claim 7, and wherein said shifting mechanism comprises first and second shifting devices axially movable and transversely spaced, the further improvement of said transversely shiftable member comprising a ball slidable in an opening extending between said devices with said one end of said axially shiftable member received in said opening, said inclined surface being a conical recess in said one end of said axially shiftable member with said ball engaging said recess, and a plug having a conical recess on an end thereof and extending into said opening and engaging said ball at a location diametrically opposed from the location of said axially shiftable member.

11. In combination with a shifting mechanism having at least two shifting devices movable from neutral positions for engaging a transmission, a starting circuit including a switch, a member cooperating with said switch and each said shifting devices, said member having a first position maintaining said switch in closed condition when said shifting devices are in neutral condition, and means interposed between said member and each said shifting devices for moving said member from said first position in response to movement of any of said shifting devices, said movement of said member from said first position causing opening of said switch whereby to render said starting circuit inoperative when any of said shifting devices are in an engaged position.

12. The combination as defined in claim 11, including the further improvement of an axially shiftable rod interposed between said member and said switch, and said member comprising a ball engaging one end of said rod and causing axial shifting of said rod in response to movement of said ball from said first position.

References Cited

UNITED STATES PATENTS

| | | | |
|---|---|---|---|
| 1,207,913 | 12/1916 | Hays | 74—477 |
| 1,802,909 | 4/1931 | Craig | 74—477 X |
| 2,654,268 | 10/1953 | Perkins | 74—745 |
| 2,701,476 | 2/1955 | Keese | 74—342 |
| 2,847,871 | 8/1958 | Schick | 74—477 |
| 2,934,054 | 4/1960 | Quinlan | 74—850 X |
| 3,365,972 | 1/1968 | Luke et al. | 74—342 |

ARTHUR T. McKEON, Primary Examiner

U.S. Cl. X.R.

74—342, 477, 745